United States Patent
Fujioka et al.

(10) Patent No.: US 7,115,680 B2
(45) Date of Patent: Oct. 3, 2006

(54) HYDROPHILIZED POROUS FILM AND PROCESS FOR PRODUCING THE SAME

(75) Inventors: Hiroki Fujioka, Ibaraki (JP); Hirotoshi Ishizuka, Ibaraki (JP); Takatoshi Sasaki, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/848,355

(22) Filed: May 19, 2004

(65) Prior Publication Data

US 2004/0242752 A1 Dec. 2, 2004

(30) Foreign Application Priority Data

May 28, 2003 (JP) .................... P. 2003-150858

(51) Int. Cl.
  *C08K 3/34* (2006.01)
(52) U.S. Cl. .................. 524/445; 521/108; 428/196; 428/224
(58) Field of Classification Search ............... 524/445; 521/108; 428/224, 196
  See application file for complete search history.

(56) References Cited

U.S. PATENT DOCUMENTS

| | | | |
|---|---|---|---|
| 4,341,832 A | * | 7/1982 | Barnett et al. ............. 428/196 |
| 4,613,544 A | | 9/1986 | Burleigh |
| 4,943,373 A | | 7/1990 | Onishi et al. |
| 5,032,450 A | * | 7/1991 | Rechlicz et al. ............ 428/196 |
| 5,368,920 A | * | 11/1994 | Schortmann ................. 442/76 |
| 5,476,590 A | | 12/1995 | Brose et al. |
| 5,698,624 A | * | 12/1997 | Beall et al. ................. 524/445 |

FOREIGN PATENT DOCUMENTS

| | | |
|---|---|---|
| DE | 196 08 760 A1 | 9/1996 |
| EP | 0 175 322 B1 | 12/1989 |
| JP | 2000-256492 A | 9/2000 |
| JP | 2000-204214 A | 11/2000 |

OTHER PUBLICATIONS

European Search Report dated Aug. 24, 2004, for EP Application # 04-01-1174.

* cited by examiner

*Primary Examiner*—David W. Wu
*Assistant Examiner*—Henry S. Hu
(74) *Attorney, Agent, or Firm*—Sughrue Mion, PLLC

(57) ABSTRACT

A hydrophilized porous film which can be obtained through hydrophilizing by a simple method without impairing rejection performance and permeation performance and easily retains the properties of a film material, and to provide a process for producing the same. The hydrophilized porous film comprises a hydrophobic polymer and dispersed therein an organized clay which has been organized with a hydrophilic compound, and is obtained by a process including a step of dispersing a clay organized with a hydrophilic compound in a solution of a hydrophobic polymer and a step of subjecting this solution to phase separation to obtain the hydrophilized porous film.

8 Claims, 1 Drawing Sheet

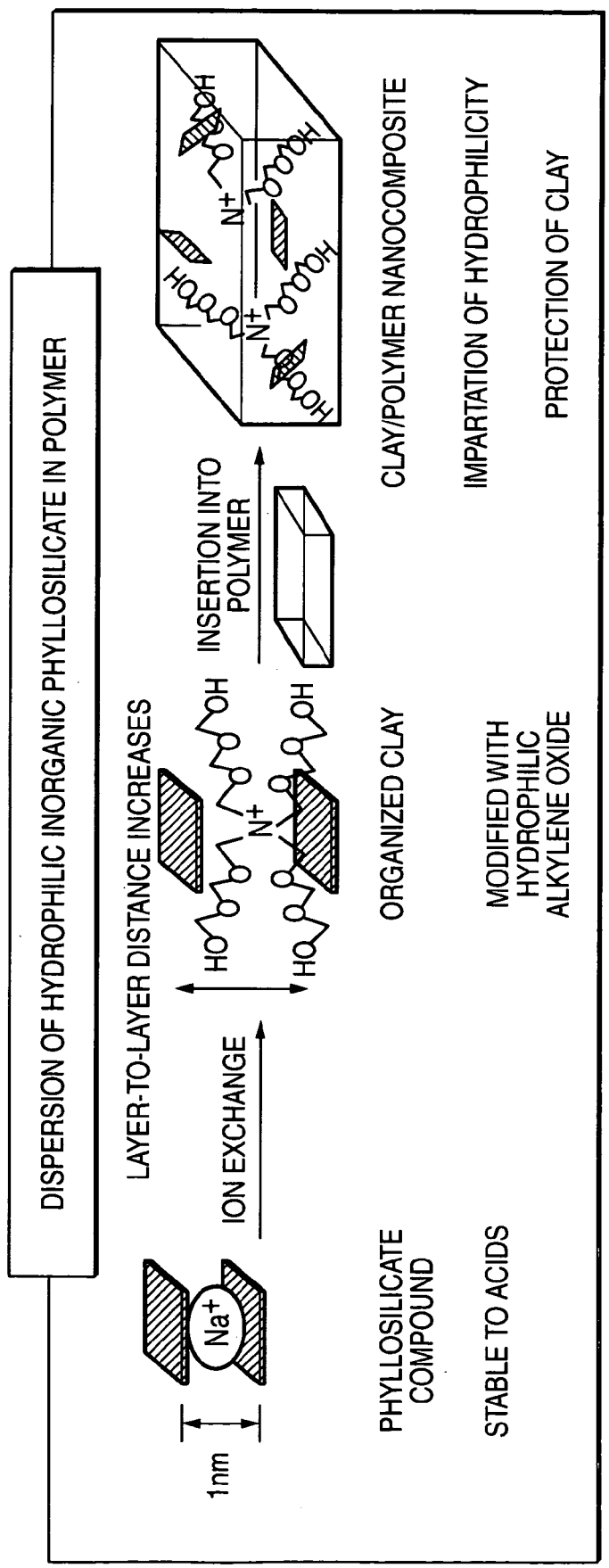

HYDROPHILIZED POROUS FILM AND PROCESS FOR PRODUCING THE SAME

FIELD OF THE INVENTION

The present invention relates to a hydrophilized porous film comprising a hydrophobic polymer and a hydrophilic substance dispersed therein and a process for producing the porous film.

DESCRIPTION OF THE RELATED ART

Coagulating sedimentation and sand filtration have generally been employed hitherto as solid/liquid separation techniques for the purification of river water or lake water and the like. However, these techniques have various problems such as the recent deterioration of raw-water quality, necessity of large-scale facilities, and acquisition of a site. On the other hand, treatments with separation membranes are regarded as important unit operations for many purposes such as the separation, purification, concentration, and fractionation of substances, etc. A single operation consisting of membrane filtration can replace the solid/liquid separating operation heretofore in use consisting of coagulation, sedimentation, and sand filtration.

At present, ultrafiltration (UF) membranes and microfiltration (MF) membranes are used for the purification of river water or lake water. The demand and market for these filtration membranes are increasing or enlarging mainly in China and the Middle East, where there are problems concerning the situation of water supply. However, separation membranes presently have a problem concerning the durability of UF membranes and MF membranes in back-pressure cleaning and chemical cleaning for long-term operation. Furthermore, a problem concerning nonfouling properties, i.e., the property of being less susceptible to the adsorption or absorption of fouling substances on the membrane surface, has been pointed out. There is a desire for a membrane material which combines these properties.

On the other hand, engineering plastics generally have such excellent properties that they have excellent chemical resistance and high physical strength. Polymers such as PVDF (poly(vinylidene fluoride)), PSF (polysulfones), PES (polyethersulfones), and PPES polyphenylsulfones have been used, so as to take advantage of those properties, to produce porous separation membranes having high durability in back-pressure cleaning and chemical cleaning, and water treatments with these separation membranes have been conducted. However, these hydrophobic polymers have lower hydrophilicity than other plastics and use of these polymers as separation membranes has had problems that solid matters contained in raw water, such as fine particles and proteins, are apt to adhere to the membrane surface and that the fouling substances which have adhered are difficult to remove.

There are various methods for hydrophilizing a porous film comprising such a hydrophobic polymer, and examples thereof include a method in which a hydrophilic substance is adhered to the surface to coat it, and a method in which hydrophilic groups are incorporated into a polymer by means of a plasma, etc. Specifically, a known method for hydrophilizing a porous PVDF film comprises wetting the porous PVDF film with a solvent, subsequently bringing the wet film into contact with a solution containing polyvinylpyrrolidone and a polymerization initiator, and crosslinking the polyvinylpyrrolidone by heating (see, for example, JP-A-11-302438).

However, the method described in JP-A-11-302438 and other methods heretofore in use have had the following drawbacks. Evenly coating a porous film, including the walls of inner micropores, with a hydrophilic substance is difficult and, hence, there have been cases where the rejection performance and permeability of the porous film are impaired. Furthermore, troubles such as the separation of the hydrophilic substance are apt to occur, and coating with the hydrophilic substance is apt to reduce the chemical resistance and resistance to back-pressure cleaning of the porous film. The method in which a hydrophilic substance is crosslinked or polymerized further has a problem that it includes complicated steps and is hence disadvantageous from the standpoint of cost.

On the other hand, a technique which has been employed from long ago for improving the mechanical properties of polymeric materials is to combine a polymer with a filler. Although short-fiber reinforcing materials (glass fibers, carbon fibers, and the like) are frequently combined with thermoplastic polymeric materials, these fillers have a size of several micrometers and are generally difficult to apply to porous films.

There is a technique in which a resin film containing an organized clay dispersed therein is stretched to cause interlaminar separation and thereby make the film porous. However, since the compound used for the organization is hydrophobic, a hydrophilic porous film has not been obtained. In addition, because pores are formed in this technique by the interlaminar separation caused by film stretching, pore diameter regulation is generally difficult and an insufficient porosity is apt to result.

Accordingly, one object of the present invention is to provide a hydrophilized porous film which can be obtained through hydrophilizing by a simple method without impairing rejection performance and permeability and is apt to retain the properties of the film material.

Another object of the present invention is to provide a process for producing the porous film.

The present inventors made intensive investigations on hydrophilizing treatments of hydrophobic polymers in order to accomplish those objects. As a result, they have found that the objects can be accomplished by nano-dispersing a clay organized with a hydrophilic compound in a hydrophobic polymer from which a porous film is to be formed. The present invention has been completed based on this finding.

The hydrophilized porous film according to the present invention comprises a hydrophobic polymer and dispersed therein an organized clay which has been organized with a hydrophilic compound. According to the hydrophilized porous film, because the clay organized with a hydrophilic compound is dispersed in the hydrophobic polymer, the porous film can be hydrophilized by a simple method without impairing rejection performance and permeation performance, as will be shown by the results of the Examples described hereinafter. Furthermore, since the organized clay is dispersed utilizing interlaminar separation in the clay, the clay comes into a finely dispersed state. Consequently, the properties of the film material become to be easily maintained.

The organized clay preferably is one obtained by organizing an inorganic phyllosilicate with an alkylene oxide compound. Such an inorganic phyllosilicate used has cations between layers, and these cations can be easily replaced by, e.g., an onium salt having an alkylene oxide group. Since an inorganic phyllosilicate can be thus organized easily, it is suitable for use in the hydrophilizing treatment in the present invention.

The process for producing a hydrophilized porous film according to the present invention comprises a step of dispersing a clay organized with a hydrophilic compound in a solution of a hydrophobic polymer, and a step of subjecting this solution to phase separation, thereby obtaining the hydrophilized porous film. According to this process, since an organized clay is dispersed in a film-forming solution before the film-forming solution is subjected to phase separation for obtaining a porous film, the film produced can be hydrophilized without impairing rejection performance and permeation performance. Thus, a hydrophilized porous film which is apt to retain the properties of the film material can be obtained.

For the same reason as described above, the organized clay preferably is one obtained by organizing an inorganic phyllosilicate with an alkylene oxide compound.

BRIEF DESCRIPTION OF THE DRAWING

The FIGURE is an illustration for explaining the mechanism of the dispersion of an organized clay.

DETAILED DESCRIPTION OF THE INVENTION

The present invention will be described in detail below.

The mechanism of the dispersion of an organized clay in the present invention is described by reference to the drawing. The FIGURE is an illustration for explaining the mechanism of the dispersion of an organized clay.

Where reinforcing molecules are dispersed in a composite material, if the reinforcement can be dispersed in a form of a molecular size (on the order of nanometer) to thereby enhance interfacial interaction, it is expected that a significant improvement in the mechanical properties of the material is attained or that an unexpected new property is imparted. Features of the polymer nanocomposites which have been reported so far are known to reside in that the composite has improved mechanical and thermal properties although specific gravity almost equals to the original polymer, and further has functional properties such as flame retardancy, gas barrier properties or transparency. In addition, there is an advantage that such a nanocomposite can be produced relatively easily from existing substances only.

The present inventors have found that the problems described above can be overcome by utilizing that technique. Specifically, they have found that the hydrophilicity of a porous film can be improved while maintaining various properties of the material, by modifying an inorganic phyllosilicate with a hydrophilic alkylene oxide to produce an organized clay and dispersing this clay to a nanometer level in a hydrophobic polymer having the high functional properties described above.

In general, even when it is attempted to disperse ultrafine particles in a matrix by mere stirring/kneading, the particles aggregate due to the interparticulate interaction resulting from an increase in interfacial energy and it is hence difficult to nano-disperse the particles. Typical examples of techniques for obtaining a composite material while avoiding aggregation of ultrafine particles include:

1) intercalation process,
2) in-situ process, and
3) direct ultrafine-particle dispersion process.

Of those, the intercalation process is most mainly used. Smectite-group clay minerals including montmorillonite are lamellar compounds. In such a mineral, the layers are in a negatively charged state and cations are present between the layers so as to compensate it. By replacing these cations with an onium salt such as a quaternary ammonium salt, the inorganic lamellar compound can be modified so as to have an organic nature. Examples of the intercalation process include: a method in which the organized clay is mixed with a monomer and the monomer is polymerized to form a polymer while simultaneously causing the clay to undergo interlaminar separation and dispersion into the polymer (monomer insertion-before-polymerization method); and a method in which the organized clay is mixed with a polymer either in a molten state or in a solvent for both to cause the clay to undergo interlaminar separation and dispersion into the polymer (polymer insertion method). The former method is known as a nylon-clay hybrid (NCH) production process which was put to practical use first in the world. Although the latter method is simpler, it is generally thought to be difficult to obtain a nanocomposite in which the clay has undergone complete interlaminar separation. In recent years, however, it was reported that a polymer-based nanocomposite had been obtained. Examples of the polymer-based nanocomposite include the fluoropolymer nanocomposite of Toyota Central R&D Labs. Inc. (JP-A-2000-204214) and the thermoplastic composite material of Sekisui Chemical (JP-A-2001-26724).

The present inventors have succeeded to obtain a hydrophilized porous film as a nanocomposite by dispersing an organized clay and a polymer serving as the material of the separation membrane in a solvent for both, stirring the dispersion with heating, and then forming a porous film therefrom through phase separation, etc.

In the present invention, a clay organized with a hydrophilic compound is used. This organized clay may be a commercial product, or can be obtained by, for example, the ion-exchange method shown in the FIGURE. Specifically, a clay organized with a hydrophilic compound can be obtained by dispersing a clay such as Na-montmorillonite in warm water with stirring and adding to the resulting dispersion, a solution of a hydrophilic compound (e.g., an onium ion-containing compound) obtained by reacting an amine compound having a hydrophilic group with, e.g., hydrochloric acid.

A clay (clay mineral) is, for example, a silicate mineral having a lamellar structure, and is a substance having a lamellar structure comprising many superposed sheets (some sheets are tetrahedral sheets constituted of silicic acid, while others are octahedral sheets containing aluminum or magnesium). The lamellar structure comprising such sheets, kinds of the elements constituting the sheets, etc., vary depending on the kind of clay.

Examples of the clay organized include smectite clay minerals such as montmorillonite, saponite, hectorite, bidellite, stevensite or nontronite, vermiculite, halloysite, and swelling micas. Such clays may be natural materials or synthetic materials. Of those, inorganic phyllosilicates that are smectite clay minerals such as montmorillonite, saponite, hectorite, bidellite, stevensite or nontronite are preferably used.

For organizing the clay, a hydrophilic compound can be used. The hydrophilic compound preferably is a compound which bonds to the clay through ionic bonds (undergoes ion exchange with the clay). Specifically, a compound having an organic onium ion, such as ammonium ion or phosphonium ion, which has a hydrophilic group, is preferable. Preferred examples of the hydrophilic group include oxyalkylene groups (including polyoxyalkylene groups) such as an oxymethylene group, oxyethylene group or oxypropylene group.

The hydrophilic compound is specifically an alkylene oxide compound, and examples thereof include a compound having an ethylene oxide skeleton, represented by $(C_2H_5)_3N^+(CH_2CH_2-O-)_n-H$, and a compound having a propylene skeleton, represented by

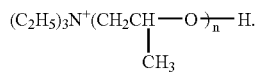

Specific examples of the organic onium ion to which a hydrophilic group is not yet imparted include a hexylammonium ion, octylammonium ion, dodecylammonium ion, laurylammonium ion, 2-ethylhexylammonium ion, and alkylsulfonium ions having the same alkyl groups. The organic onium ion preferably is a compound having one or more oxyalkylene groups, in particular, a compound having two or more oxyalkylene groups.

The particle size of the organized clay is preferably 0.01–0.5 μm, more preferably 0.05–0.1 μm, in terms of an average particle diameter determined through a measurement with an SEM or TEM. An organized clay smaller than 0.01 μm tends to show reduced dispersibility in polymers, while use of an organized clay larger than 0.5 μm tends to result in particle shedding, a decrease in film strength, and difficulties in obtaining fine pores.

The hydrophilized porous film of the present invention comprises a hydrophobic polymer and dispersed therein a clay organized with a hydrophilic compound. The term "hydrophobic polymer" used herein means a polymer that can be hydrophilized in the field of separation membranes. Examples of the polymer include PVDF (poly(vinylidene fluoride)), PSF (polysulfones), PES (polyethersulfones), PPES polyphenylsulfones, polypropylene, and polyethylene.

The amount of the organized clay contained in the hydrophobic polymer is preferably 1–60% by weight, more preferably 10–30% by weight, based on the weight of the sum of the organized clay and the hydrophobic polymer. Amounts of the organized clay smaller than 1% by weight tend to result in an insufficient effect of the hydrophilizing treatment. Amounts thereof exceeding 60% by weight tend to result in insufficient pore formation in the polymer and a disadvantage in cost.

The hydrophilized porous film of the present invention may be produced by any of processes, such as wet phase separation method, dry phase separation method or stretching method. However, from the standpoint of ease of pore diameter regulation, the porous film is preferably produced by a phase separation method. The production process according to the present invention utilizing a phase separation method will be explained below as an example.

The process includes a step of dispersing a clay organized with a hydrophilic compound in a solution of a hydrophobic polymer. This solution serves as a film-forming solution (dope) used in film formation.

N-methyl-2-pyrrolidone, dimethylformamide, dimethylacetamide, or the like is preferably used as a solvent for the polymer. A non-solvent preferably used is, for example, an aliphatic polyhydric alcohol such as diethylene glycol, polyethylene glycol or glycerol; a lower aliphatic alcohol such as methanol, ethanol or isopropyl alcohol; or a lower aliphatic ketone such as methyl ethyl ketone. When a solvent is mixed with a non-solvent to prepare a mixed solvent, the content of the non-solvent in the mixed solvent is not particularly limited as long as the mixed solvent obtained is homogeneous. However, the content of the non-solvent is generally 5–50% by weight, preferably 20–45% by weight, based on the weight of the mixed solvent. The polymer concentration in the film-forming solution is generally preferably 10–30% by weight. If the polymer concentration in the solution exceeds 30% by weight, the porous separation membrane obtained has impractical water permeability. On the other hand, if the concentration is lower than 10% by weight, the porous separation membrane obtained not only has too poor mechanical strength to obtain a sufficient back-pressure strength but also does not have practically sufficient rejection performance.

Any method may be used to disperse the organized clay in the solution. For example, a method can be used which comprises adding the organized clay to a solvent, stirring the mixture while applying ultrasonic thereto, adding a polymer and additives thereto, and then stirring the resulting mixture with heating and ultrasonic application to obtain a film-forming solution.

The content of the organized clay in the film-forming solution is preferably 1–10% by weight based on the weight of the entire film-forming solution. The heating temperature during dissolution is preferably 40–80° C. Other conditions can be the same as conventional film-forming conditions in phase separation methods.

The process according to the present invention further includes a step of subjecting the solution described above to phase separation to obtain a hydrophilized porous film. The phase separation can be accomplished by, for example, casting the film-forming solution in a given thickness, and subjecting this solution to immersion in a non-solvent or to temperature change, or both. The non-solvent for the phase separation generally used is water, a mixture of water and one or more other ingredients, or the like. Such a non-solvent has the effect of removing the solvent from the film. The porous film from which the solvent has been sufficiently removed is dried to remove water.

The present invention is especially effective to hydrophilize a porous film having an average surface pore diameter of 0.1 nm to 10 μm and a porosity of 30–80%.

The hydrophilized porous film of the present invention is usable in the food industry for bacterium removal, clarification, and protein removal in producing alcoholic beverages, fruit drinks, or the like, and for the production of ultrapure water in the semiconductor production industry and the preparation of aseptic water in the medicine industry. The porous film is also usable for the clarification of various industrial wastewaters, wastewaters from buildings or the like, and sewage, and for the treatment of river water, brackish water, or seawater as a pretreatment for desalting by reverse osmosis. A porous separation membrane for use as a microfiltration membrane or ultrafiltration membrane can be provided which can efficiently separate/remove microorganisms, fine particles, and high-molecular substances and has excellent mechanical strength.

The present invention is described in more detail by reference to the following Examples, but it should be understood that the invention is not construed as being limited thereto.

Property measurements in the Examples and Comparative Examples were made in the following manners.

Wetting Time:

Only one drop of water (about 0.01 g) was dropped on the surface of a film and the time required for the whole water to infiltrate into the film was measured. An average for two sites was used for evaluation.

Contact Angle:

Only one drop of water (about 0.01 g) was dropped on the surface of a film. At 60 seconds thereafter, the angle between the bottom of the water drop and the surface of the water drop was measured for evaluation.

Water Permeability:

A film was set in a cell having an effective film area of 35 cm$^2$. Pure water was passed therethrough at a pressure difference of 0.2 MPa to calculate the water permeability (unit: m$^3$/m$^2 \cdot$d).

Latex Rejection:

A film was set in a cell having an effective film area of 15 cm$^2$. An aqueous dispersion containing a latex having a particle diameter of 0.055 μm (concentration: 1,000 ppm) was passed in an amount of 50 ml through the film at a pressure difference of 0.1 MPa. The latex concentration in the liquid which had passed through the film was measured with a spectrophotometer to determine the latex rejection.

EXAMPLE 1

5 parts by weight of an organized clay (SEN-C3000s, manufactured by Corp Chemical) obtained by organizing an inorganic phyllosilicate with an alkylene oxide compound were added to 68.5 parts by weight of dimethylacetamide. This mixture was stirred with a stirrer at a speed of 3,000 rpm at room temperature for 4 hours while applying ultrasonic thereto. 14 parts by weight of poly(vinylidene fluoride) (KFW-#1100, manufactured by Kureha Chemical Industry), 10 parts by weight of polyvinylpyrrolidone and 2.5 parts by weight of water were added to the mixture. The resulting mixture was stirred with a stirrer at a speed of 300 rpm at a temperature of 80° C. for 3 hours while applying ultrasonic thereto to dissolve the polymers, thereby obtaining a homogeneous film-forming solution. This solution was cast on a glass plate with an applicator and then immersed in 45° C. water as a non-solvent to conduct phase separation and solvent removal. The porous film obtained was dried. Thus, a clay/PVDF nanocomposite porous film having a thickness of 50 μm was obtained.

EXAMPLE 2

2.5 parts by weight of an organized clay (SEN-C59, manufactured by Corp Chemical), 14 parts by weight of poly(vinylidene fluoride) (KFW-#1100, manufactured by Kureha Chemical Industry), 71 parts by weight of dimethylacetamide, 10 parts by weight of polyvinylpyrrolidone, and 2.5 parts by weight of water were heated for dissolution in the same manner as in Example 1 to prepare a homogeneous film-forming solution. This solution was cast on a glass plate with an applicator and then immersed in 45° C. water as a non-solvent to conduct phase separation and solvent removal. The porous film obtained was dried. Thus, a clay/PVDF nanocomposite porous film having a thickness of 50 μm was obtained.

EXAMPLE 3

5 parts by weight of an organized clay (SEN-C59, manufactured by Corp Chemical), 14 parts by weight of poly(vinylidene fluoride) (Solef 6020, manufactured by Solvay), 68.5 parts by weight of dimethylacetamide, 10 parts by weight of polyvinylpyrrolidone, and 2.5 parts by weight of water were heated for dissolution in the same manner as in Example 1 to prepare a homogeneous film-forming solution. This solution was cast on a glass plate with an applicator and then immersed in 45° C. water as a non-solvent to conduct phase separation and solvent removal. The porous film obtained was dried. Thus, a clay/PVDF nanocomposite porous film having a thickness of 50 μm was obtained.

EXAMPLE 4

5 parts by weight of an organized clay (SEN-C59, manufactured by Corp Chemical), 15 parts by weight of a polysulfone (UDELP-3500, NT-11; manufactured by Solvey), 68.5 parts by weight of dimethylacetamide, 10 parts by weight of polyvinylpyrrolidone, and 1.5 parts by weight of water were heated for dissolution in the same manner as in Example 1 to prepare a homogeneous film-forming solution. This solution was cast on a glass plate with an applicator and then immersed in 45° C. water as a non-solvent to conduct phase separation and solvent removal. The porous film obtained was dried. Thus, a clay/PSF nanocomposite porous film having a thickness of 50 μm was obtained.

COMPARATIVE EXAMPLE 1

A homogeneous film-forming solution was obtained, without using any organized clay, by heating and dissolving 22 parts by weight of poly(vinylidene fluoride) (KFW-#1100, manufactured by Kureha Chemical Industry), 75 parts by weight of dimethylacetamide, and 3 parts by weight of glycerol in the same manner as in Example 1. This solution was cast on a glass plate with an applicator and then immersed in 45° C. water as a non-solvent to conduct phase separation and solvent removal. The porous film obtained was dried. Thus, a porous PVDF film having a thickness of 50 μm was obtained.

COMPARATIVE EXAMPLE 2

A homogeneous film-forming solution was obtained, without using any organized clay, by heating and dissolving 18 parts by weight of a polysulfone (UDELP-3500, NT-11; manufactured by Solvey) and 82 parts by weight of NMP in the same manner as in Example 1. This solution was cast on a glass plate with an applicator and then immersed in 45° C. water as a non-solvent to conduct phase separation and solvent removal. The porous film obtained was dried. Thus, a porous PSF film having a thickness of 50 μm was obtained.

The results of evaluation on each porous film obtained in the Examples and Comparative Examples are shown in the Table below.

TABLE

| | Wetting time (sec) | Contact angle (°) | Water permeability | Rejection (%) |
| --- | --- | --- | --- | --- |
| Example 1 | 21.2 | 0 | 41.9 | 36.6 |
| Example 2 | 13.0 | 0 | 54.8 | 49.4 |
| Example 3 | 19.3 | 0 | 38.5 | 52.0 |
| Example 4 | 26.2 | 0 | 43.0 | 35.5 |
| Comparative Example 1 | >1000 | 90 | 52 | 35 |
| Comparative Example 2 | >1000 | 90 | 70 | 30 |

As is apparent from the results shown in the Table above, the Examples, in which a clay organized with a hydrophilic compound was dispersed, can attain remarkable impartation of hydrophilicity without impairing rejection performance and permeability.

It should further be apparent to those skilled in the art that various changes in form and detail of the invention as shown and described above may be made. It is intended that such changes be included within the spirit and scope of the claims appended hereto.

This application is based on Japanese Patent Application No. 2003-150858 filed May 28, 2003, the disclosure of which is incorporated herein by reference in its entirety.

What is claimed is:

1. A hydrophilic porous film that is completely wetted with water comprising a hydrophobic polymer and dispersed therein an organized clay which has been organized with a hydrophilic compound, wherein the organized clay has an average particle diameter of 0.01–0.5 µm.

2. The hydrophilized porous film as claimed in claim 1, wherein the organized clay is obtained by organizing an inorganic phyllosilicate with an alkylene oxide compound.

3. The hydrophilized porous film as claimed in claim 1, wherein the organized clay is present in an amount of 1–60% by weight based on the weight of the sum of the organized clay and the hydrophobic polymer.

4. The hydrophilized porous film as claimed in claim 1, wherein the hydrophobic polymer is polyvinylidene fluoride, polysulfone, polyethersulfone, polyphenylsulfone, polypropylene and polyethylene.

5. The hydrophilized porous film as claimed in claim 1, wherein the hydrophilic compound has an organic onium ion, which has a hydrophilic group.

6. The hydrophilized porous film as claimed in claim 5, wherein the hydrophilic group is an oxyalkylene group.

7. A process for producing a hydrophilic porous film that is completely wetted with water comprising a step of dispersing an organized clay with a hydrophilic compound in a solution of a hydrophobic polymer, wherein the organized clay has an average particle diameter of 0.01 to 0.5 µm, and a step of subjecting this solution to phase separation to control the average particle diameter of the organized clay and obtain the hydrophilized porous film.

8. The process as claimed in claim 7, wherein the organized clay is obtained by organizing an inorganic phyllosilicate with an alkylene oxide compound.

* * * * *